United States Patent [19]

Yamashita et al.

[11] Patent Number: 5,446,831
[45] Date of Patent: Aug. 29, 1995

[54] IMAGE DATA PROCESSOR FOR CONVERTING INPUT IMAGE DATA INTO OUTPUT IMAGE DATA SUITABLE FOR A LOWER RESOLUTION OUTPUT DEVICE

[75] Inventors: Haruo Yamashita, Osaka; Takahiko Nankou, Nishinomiya, both of Japan

[73] Assignee: Matsushita Electric Industrial Co., Ltd., Osaka, Japan

[21] Appl. No.: 239,835

[22] Filed: May 9, 1994

Related U.S. Application Data

[63] Continuation of Ser. No. 917,348, Jul. 23, 1992, abandoned.

[30] Foreign Application Priority Data

Jul. 26, 1991 [JP] Japan .................................. 3-187270

[51] Int. Cl.$^6$ .................................................. G06T 3/40
[52] U.S. Cl. ........................................ 395/102; 358/445; 395/109
[58] Field of Search ................ 395/128, 151, 102, 109, 395/162, 164–166; 358/455, 456, 451, 445; 345/186

[56] References Cited

U.S. PATENT DOCUMENTS 5,125,045 6/1992 Murakami et al. .................. 382/50
5,245,444 9/1992 Hashimoto .......................... 358/445

FOREIGN PATENT DOCUMENTS 1270094 10/1989 Japan .

*Primary Examiner*—Heather R. Herndon
*Assistant Examiner*—Michael S. Smith
*Attorney, Agent, or Firm*—Wenderoth, Lind & Ponack

[57] ABSTRACT

An image data processor includes a first memory which stores a binary image data of M1 pixels and M2 pixels in the longitudinal and lateral directions and a second memory which stores a multivalued image data of N1 pixels and N2 pixels in the longitudinal and lateral directions. The image data processor is provided with a spatial operation means for operating the binary image data of the first memory with respect to an operation area size of L1, L2 (L1, L2 being a natural number satisfying L1≧M1/N1, L2≧M2/N2) to generate the multivalued image data of the second memory, an address means for outputting positional information in the first area corresponding to the pixel position in the second area when the image data in the first area is to be reduced to 1/K1, 1/K2 in the longitudinal and lateral directions (1<K1≦L1, 1<K2≦L2), and a coefficient setting means for setting a correcting coefficient of the spatial operation means corresponding to K1, K2.

14 Claims, 8 Drawing Sheets

| b0 | b1 | b2 | b3 | b4 | b5 | b6 | b7 |
| b8 | b9 | b10 | b11 | b12 | b13 | b14 | b15 |
| b16 | b17 | b18 | b19 | b20 | b21 | b22 | b23 |
| b24 | b25 | b26 | b27 | b28 | b29 | b30 | b31 |
| b32 | b33 | b34 | b35 | b36 | b37 | b38 | b39 |
| b40 | b41 | b42 | b43 | b44 | b45 | b46 | b47 |
| b48 | b49 | b50 | b51 | b52 | b53 | b54 | b55 |
| b56 | b57 | b58 | b59 | b60 | b61 | b62 | b63 |

IMAGE DATA PROCESSOR FOR CONVERTING INPUT IMAGE DATA INTO OUTPUT IMAGE DATA SUITABLE FOR A LOWER RESOLUTION OUTPUT DEVICE

This application is a Continuation of now abandoned application, Ser. No. 07/917,348, filed Jul. 23, 1992.

BACKGROUND OF THE INVENTION

1. Field of the Invention

The present invention relates to an image data processor capable of outputting binary image data of high resolution to a display device, a video printer or the like of low resolution, with suppression of visual recognition deterioration. The image data processor is widely applicable to displaying of data of document files in personal computers, workstations, etc. or facsimile data using liquid crystal displays.

2. Description of the Prior Art

Lately, binary image data input through an image input device such as an image scanner or the like has been processed in many kinds of ways. For example, the binary image data has been directly displayed and edited on a display device, or stored and managed in an external storage, e.g., magnetic disks or optical disks before being output to a display device or a printer as needed. This situation has created a demand for an image data processor such as an image filing system or the like, and an example is disclosed in Japanese Patent Laid-Open Tokkohei No. 3-3256 (3256/1991).

A conventional example of the image data processor will be depicted hereinbelow with reference to FIG. 10.

FIG. 10 is a block diagram of the conventional image data processor, in which reference numerals represent respectively: 100 a central processing unit for controlling the operation of the whole device (referred to as a CPU hereinafter); 101 a cold cathode display device as an image output device (referred to as a CRT hereinafter); 102 a main memory of the CPU; 103 an image memory for displaying images and provided at the side of the display device separately from the main memory 102; 104 an image scanner; 105 a scanner interface (referred to as a scanner I/F hereinafter); 106 an external storage such as a magnetic disk drive, an optical disk drive, etc.; and 107 an external storage interface (referred to as an external storage I/F). It is to be noted here that although most of the latest personal computers use image output devices which store image data in the main memory 102 without having the image memory 103, the description here is related to an image data processor of the type which stores the image data in the image memory 103 and displays the same using the display device. The binary image data read by the image scanner 104 is transferred to the image memory 103 via the scanner I/F 105 or retained in the external storage 106 to be output to the image memory 103 as needed.

The operation of the conventional data processor in the above-described structure will be explained below.

When the input image read through the image scanner 104 is output to CRT 101, there are two manners of display. That is, in one, the image data is thinned to be displayed on the whole screen at one time for facilitation of confirmation of the total layout (referred to as a thin display mode hereinafter), and in the other manner, the original document image is not thinned (referred to as a direct display mode).

In general, when the input image is to be edited, namely, when the input image is to be partly moved, enlarged, compressed or rotated, the aforementioned thin display mode is practiced so that the total layout can be confirmed. For thinning the data, for instance, the original document image data is sampled every predetermined interval, or the original document image space is divided into many small sections and the small sections with one or more black picture elements are made black pixels. The latter method is called an OR method.

Meanwhile, Japanese Patent Laid-Open Publication Nos. 2-267592 (267592/1990) and 3-259193 (259193/1991) disclose to use a smoothing filter to produce multivalued data so that the characters are still easy to see even after they are compressed.

In the thin display mode to confirm the displaying state of the whole image, the binary image data is processed by a simple thinning treatment. Therefore, if the image data of many pixels obtained from a wide area of a character document or the like by an image scanner is output according to the thin display mode, the data of thin lines is omitted and fine parts of the document are broken. As a result, the visibility of the data is greatly hurt because of the lost character and graphic information. Therefore, the thinning amount of data should be reduced to display a narrower area of the document or the thin display mode is switched to the direct display mode to thereby visually confirm only a small part of the image. In other words, it has conventionally been impossible to output the data of fine parts in a manner to allow direct visual confirmation of the data while monitoring a wide range of the image data.

Although it is possible to produce multivalued data from the binary data to obtain a display which is easy to see by using the intermediate tone as is disclosed in the prior arts Tokkaihei 2-267592 and 3-259193 mentioned earlier, drawbacks yet remain to be solved in that the compression rate of the data cannot be set optionally in the former example, and the latter arrangement is complicated because of the use of the smoothing filter, resulting in a large circuit scale and is low processing speed.

SUMMARY OF THE INVENTION

The object of the present invention is therefore to provide an image data processor capable of compressing a wide area of image data with an optional rate and outputting the image data with high visibility to an output device of low resolution.

A further object of the present invention is to output multivalued images of the optimum quality for various kinds of compression rates at high speeds in a simple construction.

In order to achieve the aforementioned objects, an image data processor of the present invention is constituted of a spatial operation means for operating binary image data on a first image area with the operation area size L1, L2 (L1, L2 being a natural number satisfying $L1 \geq M1/N1$, $L2 \geq M1/N2$) to thereby produce multivalued image data on a second image area supposing that the first image area stores the binary image data of M1 and M2 pixels in the longitudinal and lateral directions (M1, M2 being a natural number not smaller than 2) and the second image area stores the multivalued image data of N1 and N2 pixels in the longitudinal and lateral directions (N1, N2 being a natural number satisfying $M1 > N1$ and $M2 > N2$), an address means for outputting positional information in the first image area corresponding to the pixel position in the second image area when the image data on the first image area is to be reduced to 1/K1, 1/K2 in the longitudinal and, lateral directions ($1<K1\leq L1$, $1<K2\leq L2$), and a coefficient setting means for setting a correcting coefficient of the spatial operation means corresponding to the K1, K2.

The above spatial operation means is provided with a coefficient setting means for setting a coefficient corresponding to the compression rate K1, K2, a bit discerning means for discerning ON/OFF of each bit included in the operation area size (L1, L2) in the first image area, and a coefficient adding means for adding coefficients output from the coefficient setting means corresponding to the position in the operation area in accordance with the discerning result of the bit discerning means. A $\gamma$ correction means of the image data processor is constituted of a ROM table provided with a plurality of input/output characteristics or a RAM table capable of setting a plurality of input/output characteristics by a microcomputer, which consists of a $\gamma$ setting means for setting an input/output characteristic thereof.

In addition to the above-described structure, the image data processor is further provided with a communications means for transmitting the compressed binary image, an expansion means for expanding the compressed data received by the communications means, and a display means for converting and displaying the binary data developed by the expansion means to the gradation data to thereby make gradational display. In still another aspect, the image data processor is provided with a read means for converting and reading the original document into binary data through binary process or pseudo gradation process, a compression means for compressing the binary data read by the read means, a communications means for transmitting/receiving outputs from the compressing means, an expansion means for expanding the compressed data received by the communications means, and a display means for converting and displaying the binary data developed by the expansion means to the gradation data to thereby make gradational display. In a still further aspect, the image data processor is provided with a bit map memory having a plurality of bit planes, a display capable of making gradational display, a plane conversion means for converting gradation pixel data to bit planes for every plurality of pixels, a communications means for transmitting the compressed binary image, and an expansion means for expanding the compressed data received by the communications means, wherein the binary data developed by the expansion means is converted to the gradation data and displayed to the display by the plane conversion means. According to yet another aspect of the present invention, the image data processor includes an external storage such as a magnetic disk or an optical disk for storing the compressed binary image, etc., an expansion means for expanding the compressed data read from the external storage, and a display means for converting and displaying the binary data developed by the expansion means to the gradation data to thereby make gradational display.

In the structure as above, the input binary image is subjected simultaneously to the band restriction, compression and multivaluing processes through spatial operation of the area size larger than an inverse number of the reduction rates (K1, K2). Therefore, the loss of the data of fine parts as a result of the thinning treatment is compensated for by the gradation data. It becomes consequently possible to output compressed images of high quality without data of fine parts such as characters and the like omitted.

More specifically, if the binary image data is simply thinned, the data of fine parts of the image is perfectly lost and the fine characters, etc. are broken. In contrast, multivalued data corresponding approximately to the average luminance of the binary image data is produced according to the present invention, and therefore the data of the fine parts are preserved as the gradation data of output pixels.

The $\gamma$ correction means corrects the nonlinear factors in the change of the quantity of light of an output device, e.g., a CRT or the like so as to utilize the gradation data of the multivalued data in the most highly recognizable state by human eyes, hence functioning to achieve the output amount of light proportional to that of the multivalued data obtained by the spatial operation means, and to make thin lines thick or make light characters dark deliberately in order to improve the distinctiveness of the original document image.

The communications means reads the original document in binary data or according to the pseudo gradation process, to thereby compress the original document before transmission. At the receiving time, the compressed data is developed and converted to the gradation data, so that the gradational image can be displayed with high visibility.

When the display makes gradational display by a plurality of bit planes, bits of the gradation data are rearranged for every plurality of pixels to be converted to the bit plane data.

Moreover, the compressed binary image stored in the external storage is developed and converted to the gradation data, so that the image is displayed with superior visibility.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE EMBODIMENTS

Preferred embodiments of the present invention will be described with reference to the accompanying drawings.

Embodiment 1

In the first embodiment, the number of pixels of the input data is assumed to be M1=1600 and M2=2560 which approximately corresponds to the upper half of an A4 document read at 300DPI. The number of pixels of the output data is assumed to be N1=400 and N2=640 which generally corresponds to a personal computer display. The compression rate (K1, K2) is variable in eight steps from $\frac{1}{2}$ to $\frac{1}{8}$, $\frac{1}{4}$, 1/5, 1/6, 1/7 to $\frac{1}{8}$.

In this case, L1≧M1/N1=4 and L2≧M2/N2=4. Since K1 and K2 is respectively 8 at maximum, L1=L2=8 is held.

Figure 1:
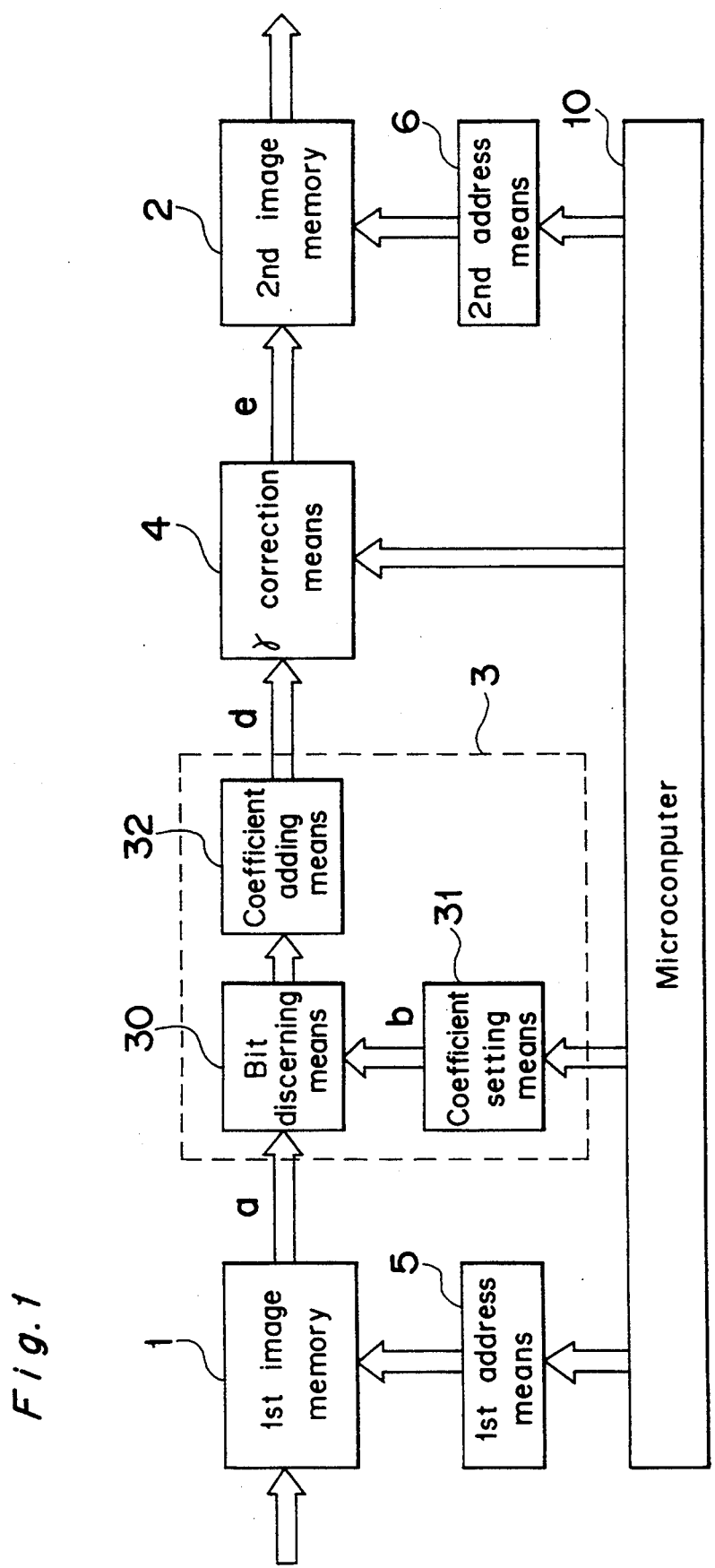
FIG. 1 is a structural block diagram of an image data processor according to a first embodiment of the present invention.

FIG. 1 is a block diagram showing the structure of an image data processor according to the first embodiment of the present invention. In FIG. 1, reference numerals are respectively: 1 a first image memory for storing input binary image data; 2 a second image memory for storing compressed multivalued image; 3 a spatial operation means; 4 a γ correction means; 5 a first address means for feeding a read address to the first image memory 1; 6 a second address means for giving a write address to the second image memory; and 10 a microcomputer for setting the compression rate and various kinds of coefficients.

The spatial operation means 3 is comprised of a bit discerning means 30, a coefficient setting means 31 and a coefficient adding means 32.

Figure 2:
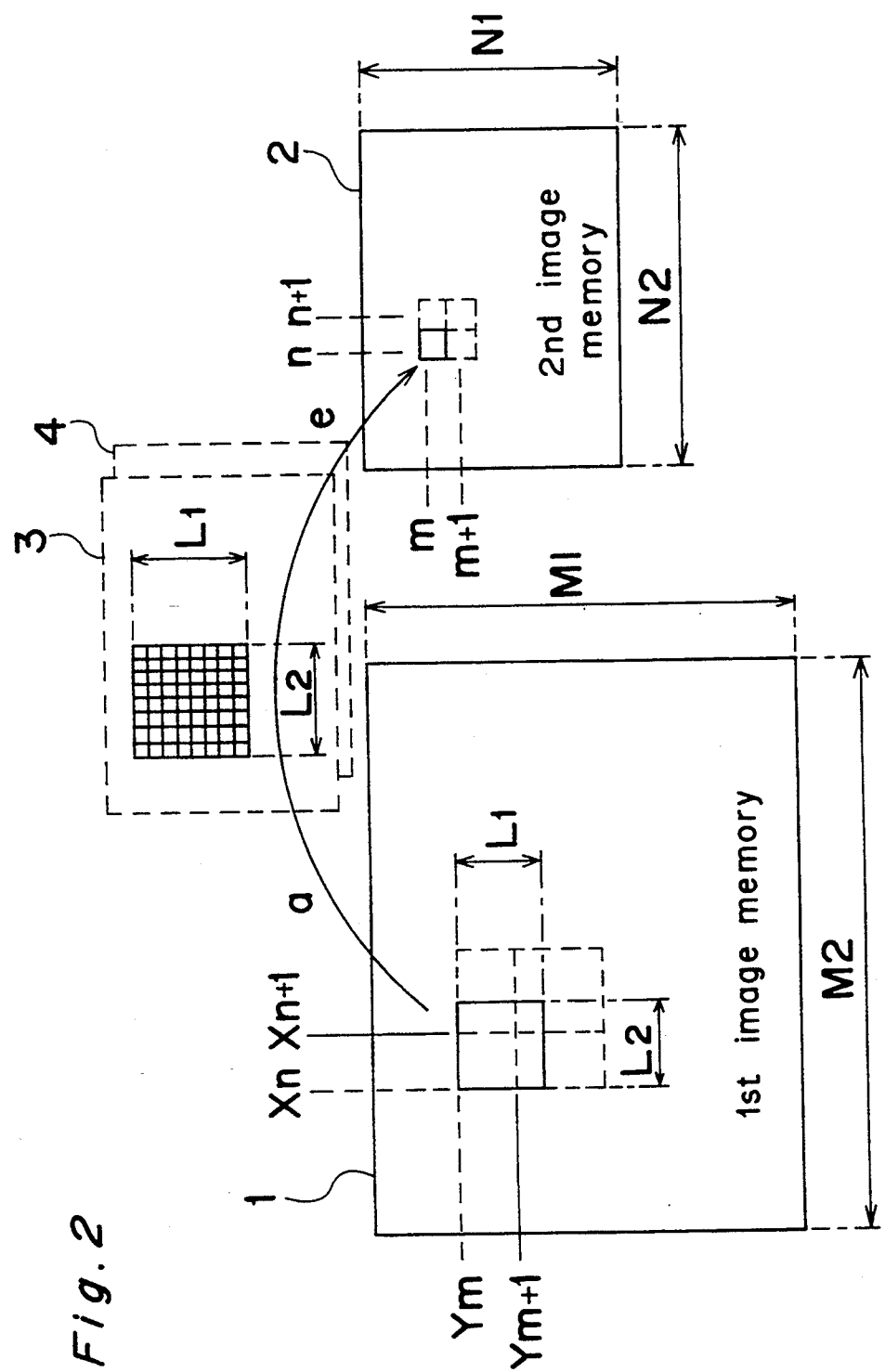
FIG. 2 is a diagram explanatory of the processing concept in the first embodiment.

FIG. 2 explains the processing concept of the image data processor. In this FIG. 2, the spatial operation means 3 and γ correction means 4 process an area of the size (L2, L1) starting from coordinates (Xn, Ym) on the first image memory 1 and store the same in coordinates (n, m) of the second image memory 2.

The operation of the image data processor, for example, when the compression rate is 1/5 both in the longitudinal and in the lateral directions will be described with reference to FIGS. 1 and 2 the drawings.

It is so assumed that when the second address means 6 outputs coordinates (n, m) on the second image memory 2, the address (Xn, Ym) on the first image memory 1 output by the first address means 5 is Xn=5*n, Ym=5*m.

Figure 3A:
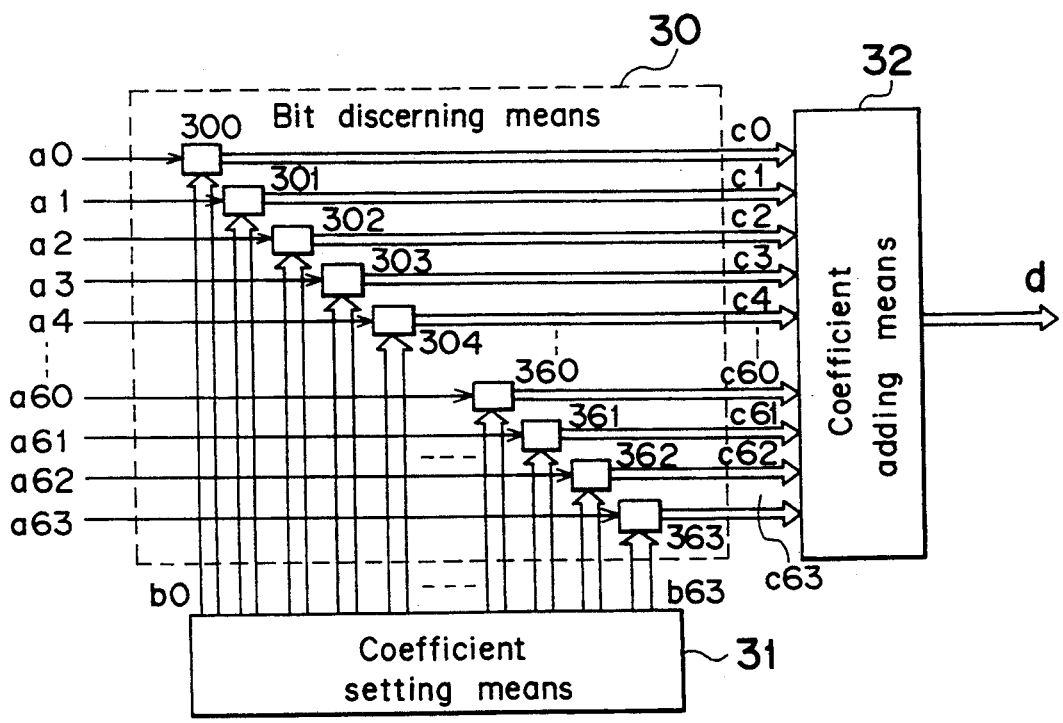
FIGS. 3(a) and 3(b) are detailed diagrams of a bit discerning means.
Figure 3B:
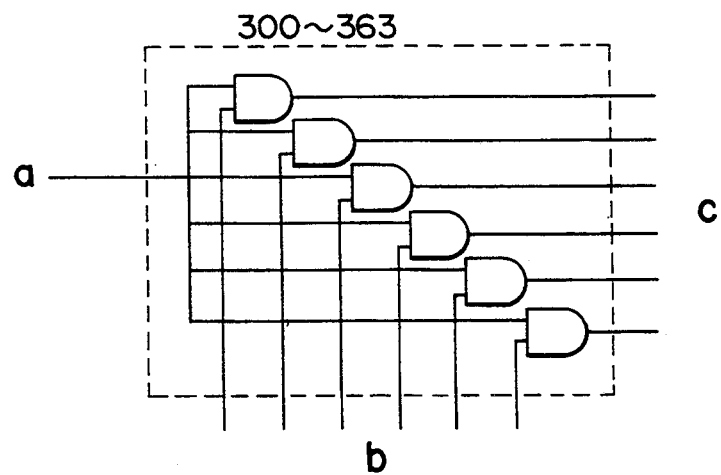
Figures 4, 5:
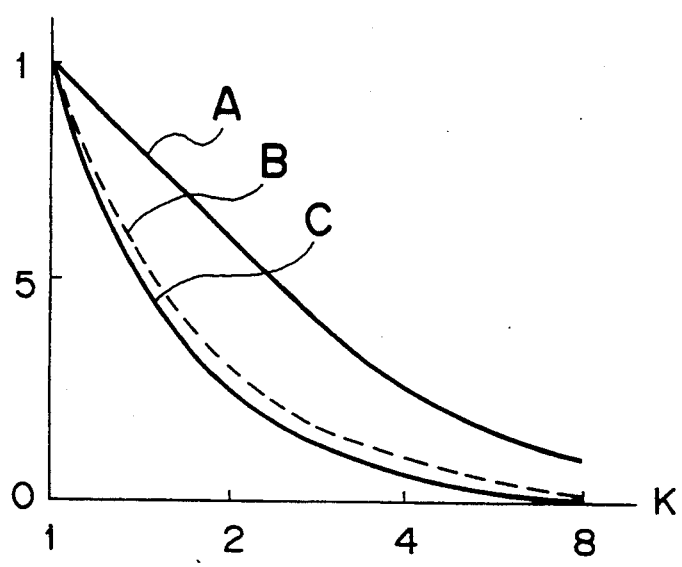
FIG. 4 is a table explanatory of the coefficient data.
FIG. 5 is a graph showing the effects of the present invention.

Since L1=L2=8 is held, 64 bit pixel data a from coordinates (Xn, Ym) to (Xn+7, Ym+7) is read from the first image memory 1 and sent to the bit discerning means 30. The bit discerning means 30 discerns each bit of the pixel data a corresponding to 64 pieces of 6 bit coefficient data output from the coefficient setting means 31 as shown in FIG. 4, and the coefficient adding means 32 adds the result. The bit discerning means 30 is indicated more in detail in FIG. 3(A). Each of the bit discerning elements 300–363 respectively corresponding to inputs a0–a63 is composed of a 6 bit AND gate as shown in FIG. 3(B). For example, when the image data a0 is 1, the corresponding 6 bit coefficient data b0 is output as it is as c0 to the coefficient adding means 32. When the image data a0 is 0, c0 of 0 is fed to the coefficient adding means 32.

The coefficient adding means 32 adds 6 bit data c0 to c63 output from the bit discerning elements 300–363 to thereby output a multivalued data d to the γ correction means 4. The multivalued data e corrected by the γ correction means 4 is stored in an address (n, m) on the second image memory 2 designated by the second address means 6.

After advancing n by 1 and Xn by 5, the same procedure as above is repeatedly performed, thereby to completely process one line. When processing of one line is finished, n and Xn are returned to 0, with m and Ym being sent forward by 1 and 5, respectively, to process a succeeding line.

A multivaluing process is carried out by repeating the foregoing procedure for all of the pixels. The processing result stored in the second image memory 2 is finally output to an external output unit.

Table 1 below shows examples of correcting coefficients of FIG. 4 output by the coefficient setting means 31 when the data is compressed to 1/5 the original document. Among seven kinds of coefficients prepared, the microcomputer 1 sets one for the coefficient setting means 31 corresponding to the compression rate.

TABLE 1

| .002 | .006 | .009 | .010 | .010 | .009 | .006 | .002 |
|------|------|------|------|------|------|------|------|
| .006 | .012 | .017 | .020 | .020 | .017 | .012 | .006 |
| .009 | .017 | .024 | .028 | .028 | .024 | .017 | .009 |
| .010 | .020 | .028 | .032 | .032 | .028 | .020 | .010 |
| .010 | .020 | .028 | .032 | .032 | .028 | .020 | .010 |
| .009 | .017 | .024 | .028 | .028 | .024 | .017 | .009 |
| .006 | .012 | .017 | .020 | .020 | .017 | .012 | .006 |
| .002 | .006 | .009 | .010 | .010 | .009 | .006 | .002 |

Figure 7:
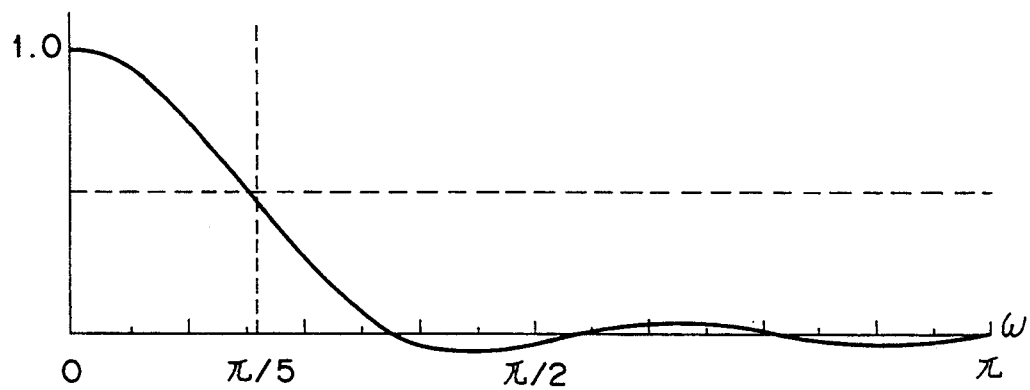
FIG. 7 is a characteristic diagram of a filter.

The angular spatial frequency characteristic of the filter in Table 1 in a first dimensional direction is shown in FIG. 7.

In FIG. 7, an axis of ordinate represents an amplitude and an axis of abscissa indicates an angular spatial frequency. Where $\omega=\pi$ is a band region included in the resolution of the original document image. The filter of the characteristic of FIG. 7 restricts the band region to 1/5. According to the instant embodiment, the optimum coefficient among those of Table 1 is set in accordance with the compression rate so as to restrict the band region corresponding to the compression rate from $\frac{1}{2}$ to $\frac{1}{8}$.

The minimum operation size for the spatial operation means to restrict the band region to a desired size is changed by the size of the band region, namely, the compression rate. For example, when the compression rate is $\frac{1}{2}$, the minimum operation size is 2×2 pixels. If the compression rate is $\frac{1}{8}$, the minimum operation size is 8×8 pixels.

Since the compression rates K1, K2 are assumed to be $\frac{1}{2}$ to $\frac{1}{8}$ in the instant embodiment, each operation size L1, L2 of the spatial operation means 3 is set to 8 which is the smallest allowable restriction of the band region corresponding to the compression rate $\frac{1}{8}$. In consequence, the filter characteristic is not good when the compression rate is $\frac{1}{2}$. However, if the compression rate is $\frac{1}{2}$, the operation size is not changed to 2×2, but the coefficient alone is changed, holding the operation size to be 8. Accordingly, in the case where the compression rate is small, it is possible to realize advantageous restriction of the band region so that the passband region is made flat and the blocking region is close to 0.

Although the filtering characteristic may be improved by increasing the operation size further even if the compression rate is large, the hardware becomes bulky in structure. Therefore, it is more effective to attach more importance to the characteristic when the compression rate is small than to the characteristic when the compression rate is large.

In any case, the present invention provides the most suitable filtering characteristic for each compression rate while utilizing the hardware components to the utmost, not leaving them idle.

Whether the restricting characteristic is good or bad greatly influences the visibility of the image. In a typical example when the restricting characteristic is poor, if the original document image is a slantwise line close to a horizontal line, the gradation characteristic is changed between the part where the position of pixels is exactly divisible to the compression rate and the part where the position of pixels is indivisible, whereby the image is formed with a changing line width. Similarly, if the original document image is a horizontal line in a character or the like, the line width is changed depending on the position of the horizontal line, and the visibility is deteriorated. When the operation size is made minimum, i.e., when the compression rate is ½, such phenomenon as above is particularly conspicuous if the average value is used as it is for filtering, for example, if each coefficient is made ¼.

As described hereinabove, according to the present invention, the minimum operation size necessary for the maximum compression rate ⅛ is determined. Even when the compression rate is reduced, therefore, the same operation size is maintained to thereby improve the restricting characteristic of the band region.

The γ correction means 4 will be discussed now. The γ correction means 4 is intended to make the outputting amount of light proportional to the level of the multivalued data operated by the spatial operation means 3 when the data is displayed at a terminal display device such as the CRT or the like of the image data processor. Therefore, the γ correction means 4 corrects the γ characteristic according to the CRT or video printer, the luminance and adjusting state of contrast of the CRT, the dot gain due to beams of the CRT and dot expansion of the printer and the other various kinds of nonlinear factors in the change of the quantity of light before the image is visually displayed. Accordingly, an amount of the gradation data can be effectively utilized to thereby enhance the visibility of the image.

Figure 6:
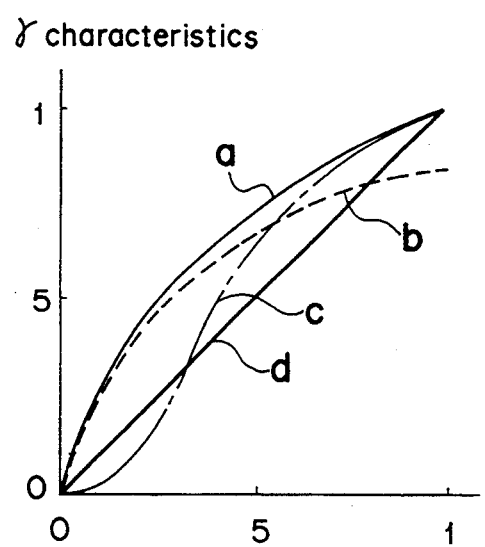
FIG. 6 is a diagram of the representative character10 istics of a $\gamma$ correction means 4.

The γ correction means 4 is constituted of a ROM table, storing four kinds of representative γ characteristics as shown in FIG. 6. The characteristic (1) corresponds to a CRT in the ideal state, with 0.45 square γ characteristic to correct 2.2 square characteristic of the CRT. The characteristic (2) is a characteristic generally used when the contrast of the CRT is raised, that is, when the white level is saturated and gradation is broken. The characteristic (3) is effective when the luminance is high and the black level is unstable or when the light from outside is reflected at the surface of the display and the black level is turned loose and unstable. The characteristic (4) is used when a display of relatively linear characteristic, for example, a liquid crystal display which realizes the gradational expression by the frame thinning method, or when a linear data is offered to a different device.

When the line width of black lines of the binary image stored in the first image memory 1 is thin and should be compressed greatly, the thin lines of the original document image become considerably light black lines. If the characteristic (3) is used in such a case as above, it becomes possible to output black lines dark. That is, the same function as when the line width of the original document binary image is treated by the enlargement process can be achieved easily. According to the present invention, it is so arranged by the software of the microcomputer 10 that the characteristic (1) is changed stepwise to the characteristic (3) for the document of thick lines to thin lines, and the characteristic (1) is changed to the characteristic (3) stepwise for the compression rate ½ to ⅛.

FIG. 5 indicates the effects of the present invention. In FIG. 5, an axis of abscissa represents an inverse number of the compression rate and an axis of ordinate denotes the relative amount of data (bit), indicating the ratio of the amount of data in each compression rate assuming that the amount of data at the compression rate 1, i.e., of the original document image is 1.

The change of the amount of data according to the conventional thinning method is expressed by a formula 1 below, and that according to the present invention in the simplest filtering method is indicated by a formula 2 below.

$$f(k) = 1/k^2 \qquad \text{Formula 1}$$

$$g(k,p) = \log_2\{(2^2-1) \cdot k^2 + 1\}/p \cdot k^2 \qquad \text{Formula 2}$$

wherein p(bit) is the number of bits in one pixel of the input image and 1/k is the compression rate.

The characteristic (C) in FIG. 5 is the above-described characteristic (1), showing that the amount of data is reduced to ¼ when the data is thinned with the compression rate ½.

The characteristic (A) is the characteristic of the image data processor of the present invention, showing the ratio of the amount of data when the original document image is a binary number, i.e., in the case of g(k,1) in the formula 2. As compared with the conventional thinning method, the amount of data is less reduced even when the compression rate is increased since the amount of the to-be-thinned data is retained in the form of the gradation. Therefore, the present invention is improved to as much as about twice the conventional example when the compression rate is ½ and, about four times when the compression rate is ¼.

The characteristic (B) is indicated for the sake of reference, which shows the ratio of the amount of data when the original document 8 bit multivalued image is filtered with the same correcting coefficient as that of the present embodiment with use of the conventional space filter performing operations by multiplication and addition, that is, identical to g(k, 8) of the formula 2. It is clear that the treatment to the multivalued image in the manner with the characteristic (B) has little effect in comparison with the simple thinning method in terms of the amount of data.

As described hereinabove, according to the present invention based on the assumption of the binary image, it becomes possible to construct the image data processor in the optimum structure which does not require the multiplying/adding operations to the binary image. The image data processor can be simplified in structure, with improvements in the amount of data.

Embodiment 2

A second embodiment of the present invention will be discussed hereinbelow with reference to the accompanying drawings.

Figure 8:
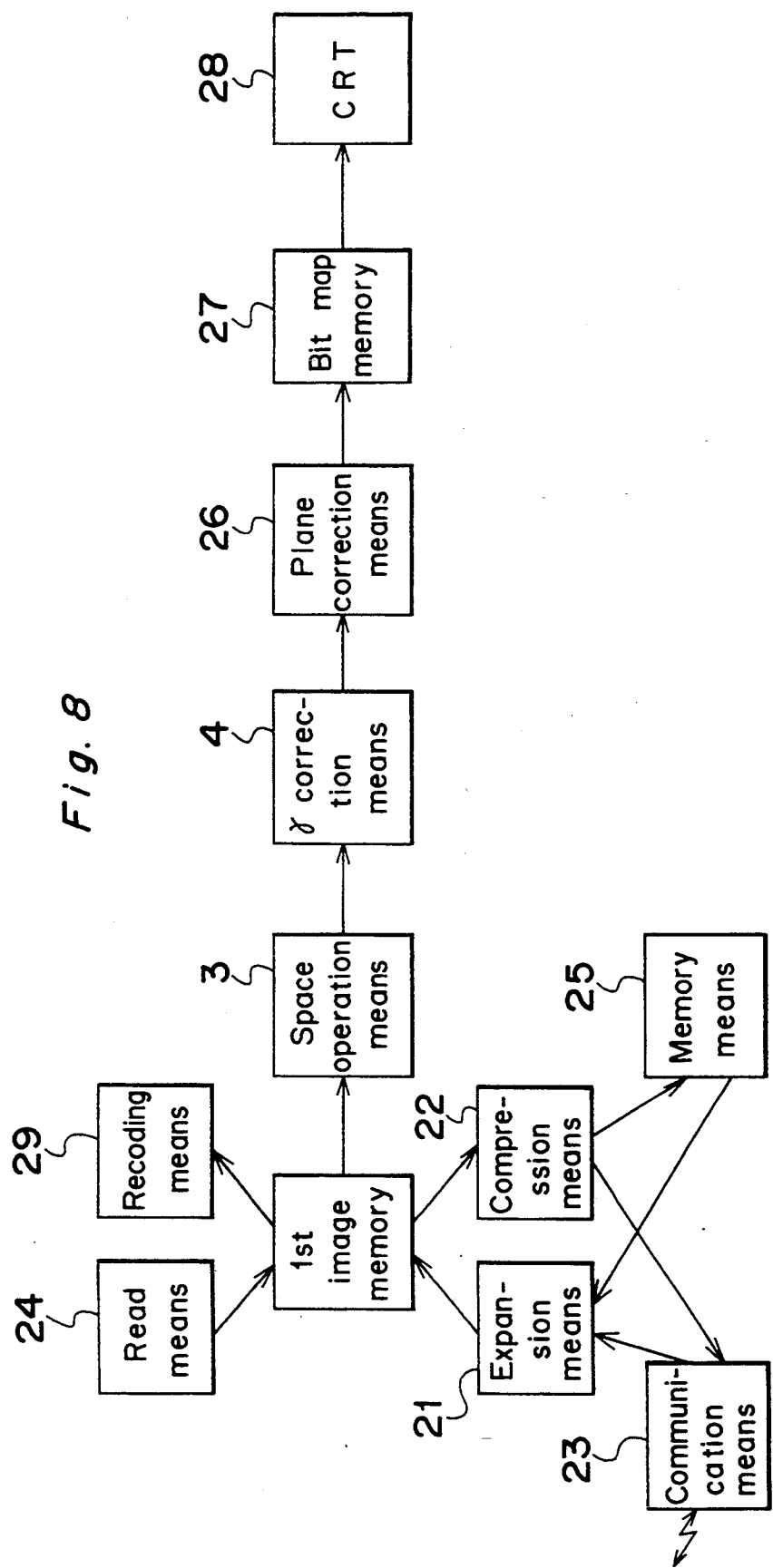
FIG. 8 is a structural block diagram of an image data processor according to a second embodiment of the present invention.

Referring to FIG. 8, reference numerals represent respectively: 21 an expansion means for expanding compressed binary data; 22 a compression means for compressing the binary data; 23 a communications means for receiving/transmitting the compressed data; 24 a read means for reading an original document; 25 a memory means for storing the compressed data; 26 a plane conversion means for converting the multivalued image data to bit planes; 27 a bit map memory consisting of four bit planes for graphic display; 28 a CRT for scanning outputs of the bit map memory 27 to thereby display generated video signals; and 29 a printer for printing the bit image data.

The operation of this image data processor will be described now.

The read means 24 reads an original document of A4 size at 300DPI. If the original document is a character document, the read means 24 reads the original document in the form of binary data. On the other hand, when the original document is a gradational image, it is read into binary data with use of a dither or according to the error dispersion method, more specifically, the A4 original document is read by 2560×3200 pixels and stored in the first image memory 1.

The printer 29 is a binary printer to record the bit image data stored in the first image memory as it is in the form of 2560×3200 pixels at 300DPI.

The compression means 22 compresses and reduces the number of bits of the bit image data in the first image memory in the same manner as a facsimile apparatus. The compressed data is retained in the memory means 25 or sent out via the communications means 23.

On the other hand, the data received by the communication means 23 or read from the memory means 25 is developed from the compressed state by the expansion means 21 to be stored in the first image memory 1. Therefore, the bit image data can be printed out by the printer 29 with the same high resolution as the data directly read from the read means 24.

However, the CRT 28 has the number of pixels as small as 1/32 the printer, namely, 640×400 pixels, and therefore it is difficult to read the displayed image in a general manner because of the insufficient resolution of CRT 28. As such, the output of the first image memory 1 is subjected to band restriction, compression and multivaluing processes by the spatial operation means 3, similar to the first embodiment described above, to thereby produce multivalued data.

In the example of the second embodiment, it is assumed that the number of pixels of the input data is M1=3200, M2=2560, the output number of pixels is N1=400, N2=640, and the compression rate is ¼, while L1≧M1/N1=4 and L2≧M2/N2=4, L1=L2=8 is satisfied in order to obtain good filtering characteristic. The multivalued image data is converted to the gradation data by selecting one of the γ characteristics of FIG. 6 by the γ correction means 4 to secure the best visibility of the image at the CRT 28. The upper and lower halves of the thus-compressed image of 640×400 pixels are switched when displayed at the CRT.

The bit map memory 27 is a bit map memory composed of four bit planes. Since the displayable number of gradations is 16, the most significant 4 bits of the output of the γ correction means 4 are converted to each plane data by the plane conversion means 26.

Figure 9:
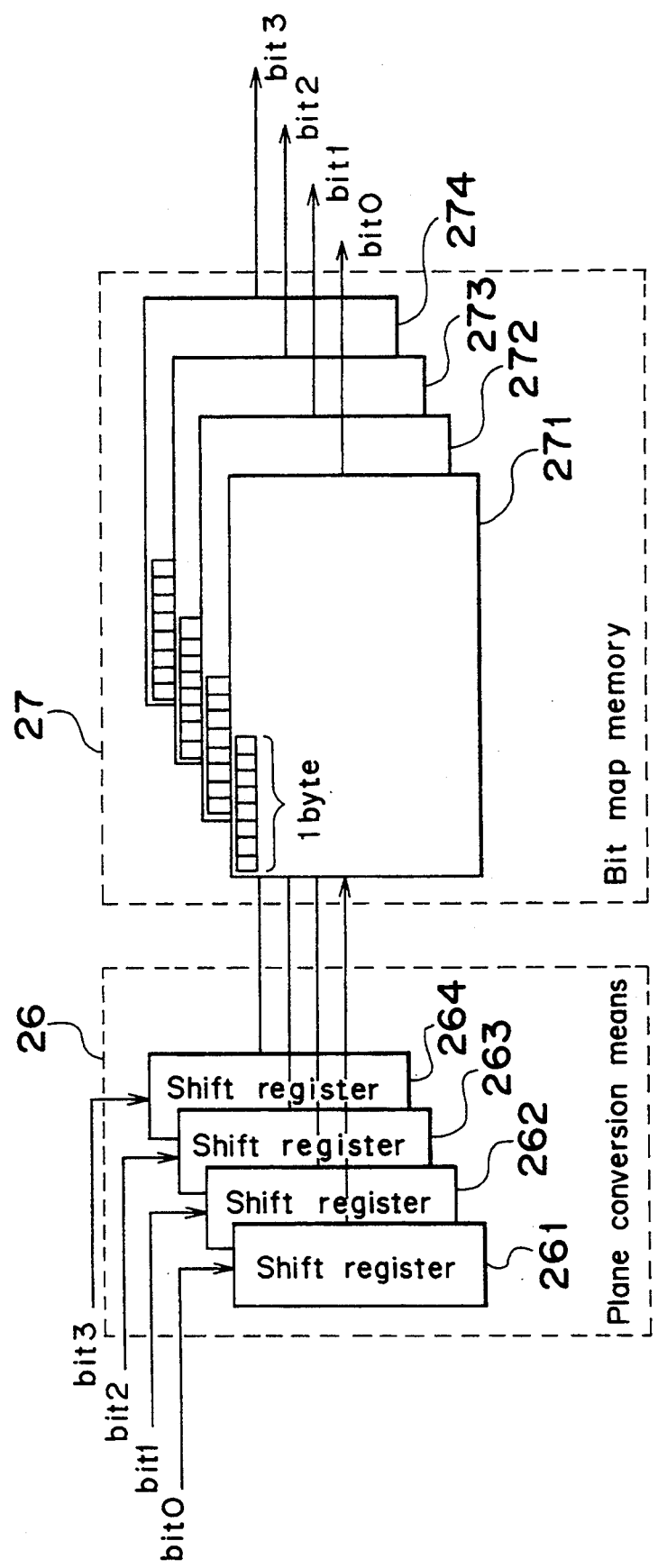
FIG. 9 is a diagram explanatory of the plane transformation.
Figure 10:
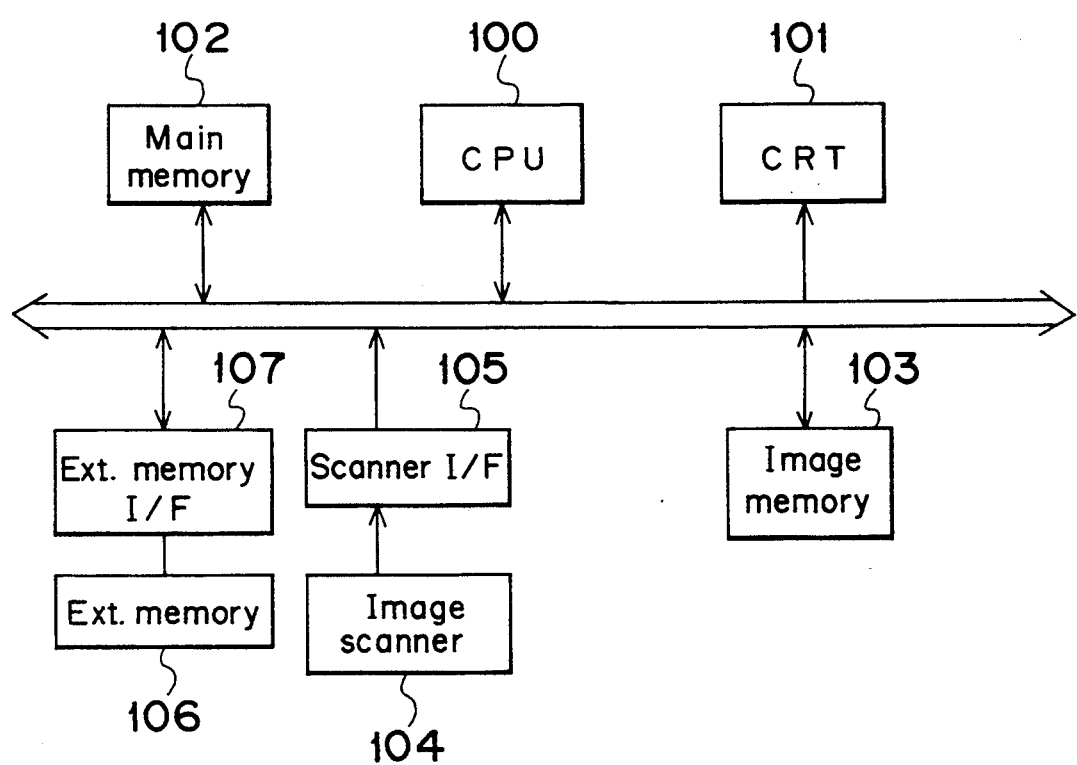
FIG. 10 is a structural block diagram of a conventional image data processor.

The structure of the plane conversion means 26 and bit map memory 27 is shown in FIG. 9.

The bit map memory 27 is composed of four binary bit planes 271, 272, 273 and 274. The bit plane 271 represents bit0 of the gradation data, while the bit plane 273 indicates bit3 thereof. Moreover, each plane is formed of 640×400 pixels. Eight pixels in the lateral direction constitutes one byte, and therefore, each plane has 80 bytes in the lateral direction. LSB is at the left end of one byte and MSB is at the right end of each byte.

The plane conversion means 26 consists of four 8 bit shift registers 261, 262, 263 and 264. The shift registers 261 and 264 store the LSB and MSB of the input gradation data, respectively.

When the most significant 4 bits of the gradation data from the γ correction means 4 are taken out, the MSB is rendered bit3 and LSB is rendered bit0. Eight pixels of the 4 bit gradation data are input to the shift registers 261–264 by clock signals and converted to a 4 byte parallel data for every bit plane. These parallel data is stored in the corresponding bit plane of the bit map memory 27 while the LSB is positioned at the left end. Plane conversion of eight pixels is hence completed and, the plane conversion of the original document is finished by repeating the above procedure for every eight pixels.

The output from the bit map memory 27 is read out with the frequency of the image signal as the 4 bit gradation data, and sent to the CRT for the gradational display.

In the arrangement as depicted hereinabove, the image can be displayed on the CRT of low resolution with the same visibility as obtained by the printer even if the CRT has the number of pixels of only ¼ the printer or scanner.

Although the compression rates K1, K2 are respectively set to be an integer in the foregoing embodiments for simplifying the explanation, needless to say the compression rate can be varied continuously by setting the filtering coefficients finely and using the interpolation of data as well.

Moreover, although the γ correction means 4 is formed of a ROM table, it is possible to use a RAM table to set curves of various kinds of characteristics by the microcomputer 10. It is also possible to construct the γ correction means 4 directly by hardware through approximation of functions or the like.

In the foregoing embodiments, the whole area of the first image memory 1 is processed according to the method of the present invention. However, the first image memory may be processed partially.

Further, instead of the binary image data formed on the bit map memory, binary data directly obtained from an external storage or an image scanner may be used so long as a fundamentally equivalent signal can be obtained.

The multivalued image data may be output directly to an external storage or the like which works fundamentally equivalently to when the data is stored on the image memory as in the present invention.

The output device is not restricted to a CRT, but may be a video printer which visualizes the image by adhering adhered ink adhered to a recording paper to thereby execute multivalued recording.

According to the present invention, since the input binary image is subjected to band restriction, compression and multivaluing processes at one time through spatial operation in order to be thinned, the loss of the data of fine parts is compensated for by the gradation data, thus making it possible to output compressed images of high quality without missing the fine data such as character data or the like. Therefore, such an image data processor is provided that can output images with natural gradation from the image data of a wide area even by the use of an output device with a small number of pixels.

The spatial operation means of the present invention, utilizing the feature that the input signal is binary, removes multiplying operations from generally-conducted multiplying/adding operations, thereby reducing the circuit scale remarkably and achieving the spatial operation at high speeds. The spatial operation means not only performs smoothing and multivaluing processes simultaneously, but is capable of selecting the optimum filtering characteristic for an optional compression rate. Therefore, multivalued images with highest visibility can be obtained.

Since the γ characteristic proper to the CRT or video printer, the luminance and adjusting state of contrast of the CRT, the dot gain due to the beams of the CRT and dot expansion of the printer, and the other nonlinear factors of the gradation before the image is visually displayed are corrected by the γ correction means, outputs are obtained with natural gradation. Data of the maximum amount can be obtained as the gradation data from the thinned and lost data.

It is possible to make lines thick by changing the γ characteristic corresponding to the compression rate. Even if the compression rate is large or the original document image has lines of a small width, the contrast of the image is improved, thereby increasing the visibility of the image.

The present invention enables the spatial operation of the area size relatively large to the thinning when the compression rate is small. Accordingly, a lowpass filter having the cutoff characteristic close to an ideal one is realized, so that the more increased amount of data can be reproduced as the gradation data.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image data processor comprising a first image memory for storing a binary image data of a first image having M1 pixels in a longitudinal direction and M2 pixels in a lateral direction and a second image memory for storing a multivalued image data of a second image having N1 pixels in the longitudinal direction and N2 pixels in the lateral direction, where M1, M2, N1 and N2 are positive integers and where $M1 > N1$ and $M2 > N2$, said image data processor for converting and reducing the binary image data stored in said first image memory into the multivalued image data according to a designated reduction rate and for storing the multivalued image data in said second image memory, and further comprising:

coefficient setting means for setting two dimensional correction coefficients $L1 \times L2$, where L1 and L2 are fixed positive integers determined from inverses of preset maximum reduction rates in the longitudinal and lateral directions, respectively;

spatial operation means comprising a coefficient adding means for summing together correction coefficients set at respective bits in an operation area of $L1 \times L2$ pixels by said coefficient setting means and a bit discerning means for discerning an ON/OFF status of each bit of said image data stored in said first image memory which is included in the operation area of $L1 \times L2$ pixels to determine whether a correction coefficient at said each bit is to be summed by said adding means; and address means for outputting positional information of said first image memory corresponding to respective pixel positions of said second image memory at which the produced multivalued image data are to be stored.

2. An image data processor according to claim 1, further comprising a communication means for transmitting the binary image data, and a display means for converting and displaying the binary image data received by said communications means into a gradation data.

3. An image data processor according to claim 1, further comprising a communications means for transmitting a compressed binary image data, an expansion means for expanding the compressed binary image data received by said communications means, and a display means for converting and displaying the binary data developed by said expansion means to a gradation data.

4. An image data processor according to claim 1, further comprising a read means for reading an original document into binary data or converting into binary data using a pseudo gradation process, a compression means for compressing the binary data read by said read means, a communication means for transmitting/receiving the output from said compressing means, an expansion means for expanding the compressed data received by said communications means, and a display means for converting and displaying the binary data developed by said expansion means into a gradation data.

5. The image data processor according to claim 1, further comprising with a communication means for communicating a compressed binary image data with respect to an external device, an expansion means for expanding the compressed binary image data received by said communication means to store the expanded binary image data in said first image memory, a plane conversion means for converting multivalued image data converted by said spatial operation means and stored in said second image memory to a bit plane for every plurality of pixels, a bit map memory having a plurality of bit planes and a display for displaying multivalued image data stored in said bit map memory for storing a compressed binary image data.

6. An image data processor according to claim 1, further comprising an external storage device for storing the binary image data, and a display means for converting and displaying the binary image data read from said external storage device into a gradation data.

7. An image data processor according to claim 1, further comprising an external storage device for storing a compressed binary image data, an expansion means for expanding the compressed binary image data read from said external storage device, and a display means for converting and displaying the binary data developed by said expansion means to a gradation data.

8. An image data processor comprising a first image memory for storing a binary image data of a first image having M1 pixels in a longitudinal direction and M2 pixels in a lateral direction and a second image memory for storing a multivalued image data of a second image having N1 pixels in the longitudinal direction and N2 pixels in the lateral direction, where M1, M2, N1 and N2 are positive integers and where $M1 > N1$ and M2>N2, said image data processor for converting and reducing the binary image data stored in said first image memory into the multivalued image data according to a designated reduction rate and for storing the multivalued image data in said second image memory, and further comprising:

coefficient setting means for setting two dimensional correction coefficients L1×L2 are set, where L1 and L2 are fixed positive integers determined from inverses of preset maximum reduction rates in the longitudinal and lateral directions, respectively;

spatial operation means comprising a coefficient adding means for summing together correction coefficients set at respective bits in an operation area of L1×L2 pixels by said coefficient setting means and a bit discerning means for discerning an ON/OFF status of each bit of said image data stored in said first image memory which is included in the operation area of L1×L2 pixels to determine whether a correction coefficient at said each bit is to be summed by said adding means;

address means for outputting positional information of said first image memory corresponding to respective pixel positions of said second image memory at which the produced multivalued image data are to be stored; and $\gamma$ correction means for correcting a gradation characteristic of multivalued data output from said spatial operation means with a correction characteristic determined based on a $\gamma$ characteristic of a display.

9. The image data processor according to claim 8, wherein said $\gamma$ correction means is constituted of a ROM table storing a plurality of input/output characteristics and a $\gamma$ characteristic setting means for setting said input/output characteristics.

10. The image data processor according to claim 8, wherein said $\gamma$ correction means is constituted of a RAM table storing a plurality of input/output characteristics set by a microcomputer and a $\gamma$ characteristic setting means for setting said input/output characteristics responsive to said microcomputer.

11. The image data processor according to claim 9, wherein said $\gamma$ characteristic setting means selects one of said input/output characteristics in accordance with a luminance, a contrast and a density of an image output device connected to said image data processor and monitoring conditions.

12. The image data processor according to claim 10, wherein said $\gamma$ characteristic setting means selects one of said input/output characteristics in accordance with a luminance, a contrast and a density of an image output device connected to said image data processor and monitoring conditions.

13. The image data processor according to claim 9, wherein said input/output characteristics include a correction characteristic for correcting a $\gamma$ characteristic of a display and a variable characteristic for correction a half tone range of a $\gamma$ characteristic toward dark side wherein the degree of correction toward dark side is varied in accordance with a designated reduction rate.

14. The image data processor according to claim 13, wherein said $\gamma$ characteristic setting means selects said correction characteristic for correcting a $\gamma$ characteristic of a display when the input image is a half tone image and, when the input image is a character image, selects said variable characteristic varied in accordance with the designated reduction rate.

* * * * *